Figure 1:
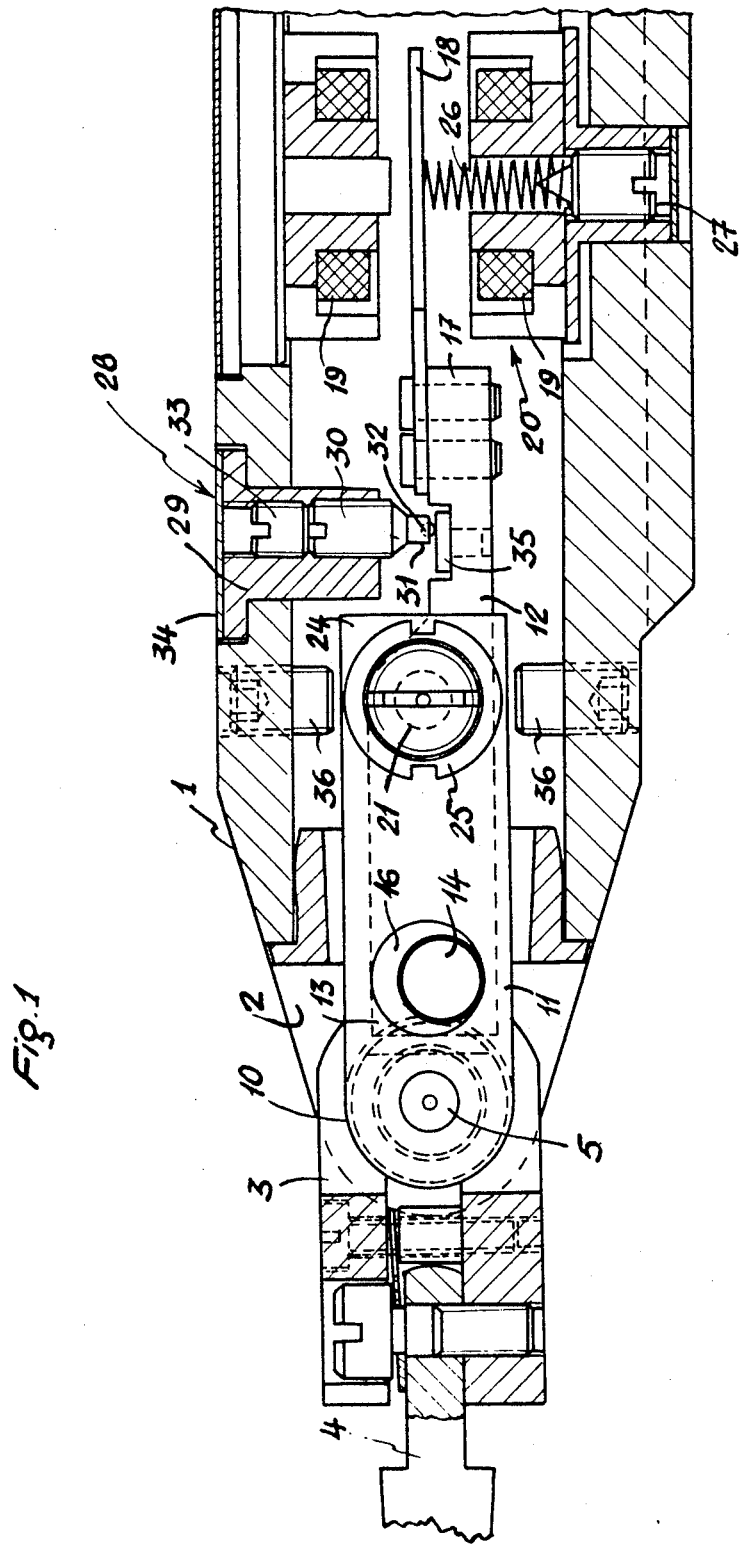

United States Patent [19]
Nigg et al.

[11] 3,812,590
[45] May 28, 1974

[54] ELECTRONIC SENSOR

[75] Inventors: Fritz Nigg, Lausanne; Jean-Claude Risse, Prangins, both of Switzerland

[73] Assignee: Tesa S.A., Renens, Switzerland

[22] Filed: Apr. 9, 1973

[21] Appl. No.: 348,911

[30] Foreign Application Priority Data
May 18, 1972   Switzerland............ 7373/72

[52] U.S. Cl. ................ 33/172 E, 33/DIG. 8
[51] Int. Cl. ................................ G01b 7/10
[58] Field of Search .......... 33/172 E, 172 B, 148 H, 33/148 R, 171, 169 R, 147 N, 170

[56] References Cited
UNITED STATES PATENTS

| 1,399,314 | 12/1921 | Nicholson | 33/172 |
|---|---|---|---|
| 2,091,376 | 8/1937 | Reich | 33/172 B |
| 3,047,956 | 8/1962 | German | 33/169 R |

*Primary Examiner*—Harry N. Haroian
*Assistant Examiner*—John W. Shepperd
*Attorney, Agent, or Firm*—James M. Heilman; Anthony J. Casella; Wm. O. Heilman

[57] ABSTRACT

An electronic sensor with lever wherein a lever carrying a feeler is pivoted at the end of a casing, the movements of said feeler being transmitted to the movable element of an electronic transducer by means of a reversing mechanism having two levers whereof the first is fixed to the lever carrying the feeler and pivots about the same shaft as the latter, said mechanism being able to move, counter the action of at least one elastic member, the movable element of the transducer in a same direction in response to any displacement of the lever carrying the measuring key effected from a rest position in the two pivotal directions of the lever carrying the feeler.

7 Claims, 2 Drawing Figures

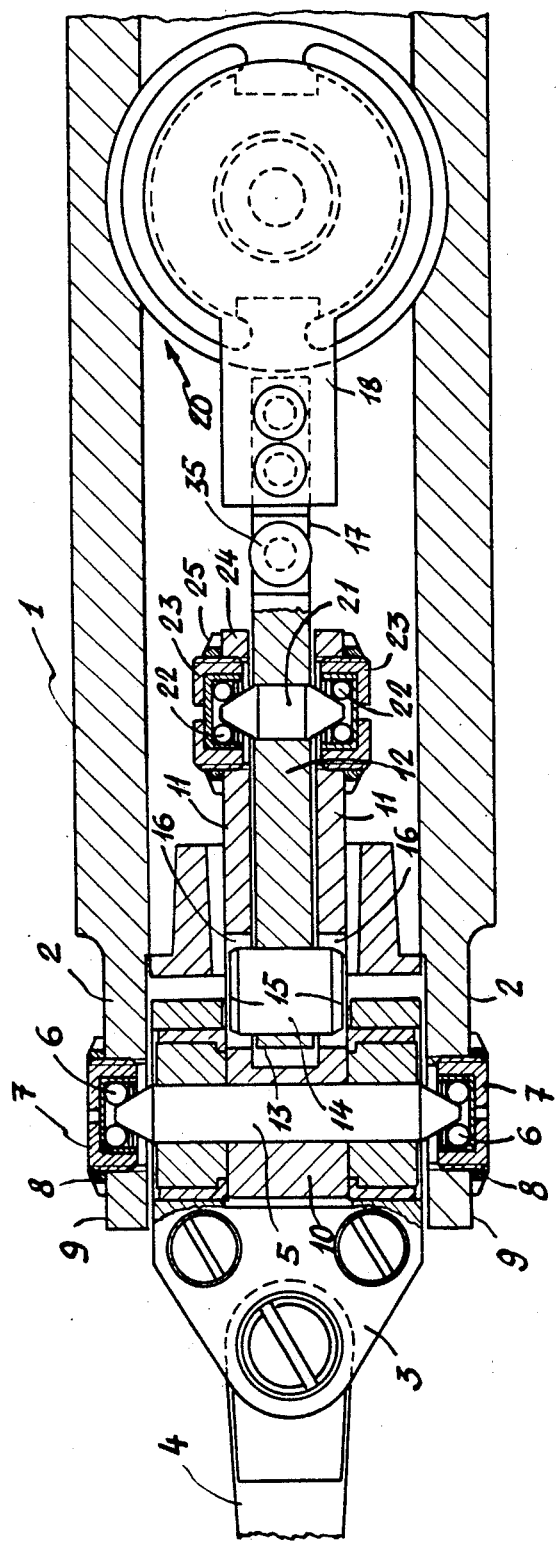

ELECTRONIC SENSOR

This invention concerns an electronic sensor.

According to the invention there is provided an electronic sensor with lever wherein a lever carrying a feeler is pivoted at the end of a casing, the movement of said feeler being transmitted to the movable element of an electronic transducer located in the casing via a reversing mechanism with two levers whereof the first is fixed to the lever carrying the feeler and pivots about the same shaft as the latter said mechanism being able to move, counter to the action of at least one elastic member, the movable element of the transducer in a same direction in response to any displacement of the lever carrying the feeler from a rest position in the two pivoting directions of the lever carrying the feeler. The second lever of the reversing mechanism is mounted pivotably on the first lever of said reversing mechanism and controls the movements of the movable element of the transducer, said second lever being subjected to the action of the elastic element and two stop means the first stop means being fixed to the two levers and functions counter to the action of the elastic member to limit the pivotal movement of the second lever relative to the first lever in the action direction of the elastic member when the first lever is pivoted in a direction counter to the action of the elastic member. The second stop is located beyond the pivotal shaft of the second lever on the first lever and is adjustable relative to said pivotal shaft of the second lever on the first lever and fixed to the casing and functioning counter to the action of the elastic member to limit the joint pivotal movement of the two levers about the pivotal shaft of the first lever in the action direction of the elastic member when the first stop means prevents the pivoting of the second lever relative to the first lever in the action direction of the elastic member. The second stop means prevents the pivoting of the second lever relative to the first lever in the action direction elastic member when the first lever is pivoted in the action direction of the resilient member in such a way that when the first lever is pivoted in the direction counter to the action of the elastic member, the second lever is retained by the first stop means and pivots jointly with the first lever about the rotary shaft thereof in the direction counter to the action of the elastic member. When the first lever is pivoted in the action direction of the elastic member the second lever is retained by the second stop means and pivots relative to the first lever in the direction counter to the action of the elastic member. When in the rest position when the first lever is not subjected to any pivoting action the two stop means respectively prevent the relative pivoting of the second lever relative to the first lever in the action direction of the elastic member and also prevent the joint pivoting of the two levers about the pivotal shaft of the first lever in the action direction of the flexible member.

The accompanying drawing shows as an example an embodiment of the object of the invention.

FIG. 1 is a longitudinal section in side view,
FIG. 2 is a section in plan.

The sensor shown comprises a casing 1 having an essentially tubular shape and whereof one end has two parallel cheeks 2 between which is located a support 3 to which is fixed in known manner a partly shown lever 4 carrying at its end a feeler (not shown). The support 3 is coupled to a shaft 5 whose ends are conical and each engaged in a ball-type thrust bearing 6 located in a cup 7 screwed into the cheek 2 where it is locked in place by a nut 8 supported on the outer surface 9 of cheek 2.

On the shaft 5 is arranged the body of a lever 10 having two parallel branches 11 extending within casing 1. The body of lever 10 is coupled to the support 3 by means of an assembly of known type which is not described, said assembly connecting together the two said members.

Between the branches 11 of lever 10 extends a lever 12 whose end 13 carries a cylindrical transverse thrust member 14 extending on either side of said lever 12 and whereof the ends 15 are respectively engaged in two circular transverse openings 16 made in the branches 11 of lever 10. The diameter of the openings 16 is substantially greater than that of the stop member 14 so that the ends thereof can move radially in said opening 16. The other end 17 of lever 12 carries a lamella 18 disposed between the coils 19 of a transducer 20 with which it forms an inductive system of known type and which will not be described in greater detail. Lever 12 carries a transverse shaft 21 whose ends are conical and mounted so as to rotate respectively in the ball-type thrust bearing 22 each located in a cup 23 screwed into the end 24 of the branch 11 where it is locked in place by a nut 25 which is supported against the outer surface of said branch 11. Lever 12 is thus pivoted between branches 11 of lever 10 and this pivoting movement is limited by the movement of the stop member 14 in opening 16. A spring 26 located in one of the coils of transducer 20 is supported against lamella 18. This spring 26 is mounted on a screw 27 located in coil 19 of transducer 20 which permits variation of the compression of said spring 26 and therefore its support force on lamella 18.

In the wall of casing 1 is mounted in a rotational manner an eccentric stop member 28 formed by a support 29 pivoted in the wall of casing 1 and wherein is introduced a screw 30 whose axis is offset relative to the axis of rotation of support 29. The screw 30 is terminated by a tenon 31 wherein is encased a ball 32. A screw 33 which also engaged in support 29 assures the locking of screw 30 whilst a protective plate 34 covers support 29. Ball 32 is supported on a support disc 35 arranged on lever 12. The eccentric stop member 28 and the support disc 35 are arranged in such a way that the support point which they form is placed beyond the pivoting shaft 21 of lever 12, i.e., on the side of the free end of lever 12. Moreover the action of spring 26 is such that the support disc 35 is held against the ball 32 of stop member 28.

On either side of the lever 12 two branches of lever 10 engage stop members 36 to limit the pivoting of said lever 10. These stop members comprise screws which engage in the wall of casing 1.

The sensor described functions as follows: in the rest position, i.e., when the feeler 4 is not subjected to pressure the spring 26 pushes lamella 18 in an upward direction (FIG. 1) and maintains lever 12 applied against the ball 32 of stop member 28. Under the action of spring 26 and lever 12 tends to pivot on shaft 21 in a counter clockwise direction. Stop member 14 which is fixed to lever 12 performs the same operation and comes into contact with the lower edge of the two openings 16 of lever 10 and prevents pivoting of lever 12 whilst levers 10 and 12 cannot pivot jointly because lever 12 is retained by stop members 28 and 14 and the levers 10 and 12 are coupled to one another by shaft 21. The system is thus in equilibrium and feeler 4 which is fixed to lever 10 by means of support 3 is subjected to no pressure and is therefore also in a state of stable equilibrium.

When feeler 4 is moved upwards (FIG. 1) support 3 and therefore lever 10 which are fixed thereto pivot in a clockwise direction about shaft 5. Lever 10 drives in its pivotal movement shaft 21 and therefore lever 12 which moves in the same direction counter to the action of spring 26 which maintains stop member 14 in contact with the lower wall of openings 16 of lever 10. Levers 10 and 12 therefore move together in a clockwise direction about the centre of rotation of shaft 5 and lamella 18 carries out the same operation. The movement of the lamella in transducer 20 causes a signal from said transducer which is a function of the movement of the lamella 18 and therefore of feeler 4.

If feeler 4 is moved downwards (FIG. 1) support 3 and therefore lever 10 which are fixed thereto pivot in the counter clockwise direction about shaft 5. Lever 10 drives, in its pivotal movement, shaft 21 which drives with it lever 12. However since this latter cannot move in an upward direction because it is in abutment against ball 32 of stop member 28 and is mounted in a rotational manner between the branches 11 of the lever 10 via shaft 21 and since the casing 14 can move radially in openings 16 of lever 10, the lever 12 pivots in the clockwise direction counter to the action of spring 26. The centre of rotation of this pivotal action is shaft 21 and the lamella 18 also moves in a clockwise direction. The movement of lamella 18 in transducer 20 produces a signal therefrom which is a function of the displacement of lamella 18 and therefore of the feeler 4.

As has been shown by the above lamella 18 always moves in the same direction either downwards or in a clockwise direction according to the direction in which the feeler is moved. The movement transmission system of the feeler therefore serves as an automatic reverser of the sensing direction of the feeler 4 and the signal supplied by the transducer is therefore always in the same direction.

It is pointed out that in one displacement direction of feeler 4, lamella 18 pivots about the arc of a circle centred on shaft 5 whilst in the opposite displacement direction of feeler 4 lamella 18 pivots about a radius centred on shaft 21 which leads to the system geometry being deformed in one of the displacement directions of the feeler. For the same displacement of the feeler in the two directions the angular positions of the lamella 18 relative to transducer 20 therefore will differ from one another and the transducer can supply signals which will not be identical in the two displacement directions of the feeler. In order to correct this effect it is sufficient to act on the eccentric stop member 28 to change the support point of ball 32 on disc 35 and therefore modify the pivoting geometry of lever 12 when lever 10 pivots in the counter clockwise direction. As the angular positions occupied by lever 12 are a function of the position of support ball 32 relative to the centre of rotation of shaft 21 the rotation of support 29 displaces screw 30 as well as ball 32 which modifies the position of the support point of ball 32 relative to the centre of rotation of shaft 21. The eccentric stop member 28 therefore permits the modification of the geometry of the reversing system in such a way as to obtain identical signals for the two displacement directions of the feeler. It is also possible to adjust the axial position of the stop member 28 by operating screw 30.

The particular arrangement of shafts 5 and 21 whereof the conical ends are pivoted in ball-like thrust members located in the members which have a certain elasticity in the direction of said shafts, in the case of cheeks 2 of casing 1 and branches 11 of lever 10 permits a constant locking bringing about the automatic taking up of any play in the event of wear. During assembly of shafts 5 and 21 and there respective bearings it is possible to regulate the axial position of the ball-like thrust members in such a way that the elasticity of cheeks 2 and branches 11 can exert an influence. The locking of shafts 5 and 21 will thus be elastic therefore providing rotary shaft - bearing systems without any play.

According to a variant the system comprising stop member 14 and openings 16 can be replaced by some other stop means for example a stop member located at the end of lever 10 close to the pivoting shaft 21 of lever 12 or any other equivalent means. In spite of the positioning of spring 26 in member 19 of transducer 20 representing a preferred solution for facilitating the balancing of pressures in the two operating directions of the automatic reversing system it is also possible to replace said spring 26 by one or more springs arranged somewhere other than in the transducer for example in casing 1 with direct action on lever 12. In addition all types of flexible members can be used.

Finally although it represents a preferred solution because it permits the elastic mounting of shaft 21 lever 10 with two branches 11 can be replaced by a lever having only one branch.

Finally inductive transducer 20 can be replaced by any equivalent means.

What we claim is:

1. An electronic sensor comprising: a casing; an arm carrying a feeler and pivoted at one end of the casing; an electronic transducer located in the casing adjacent the opposite end thereof, said electronic transducer including a movable element, an elastic member mounted in said casing, a reversing mechanism operatively connecting said feeler to said electronic transducer, said reversing mechanism including two levers, the first lever being fixed to the arm carrying the feeler and pivotable about the same shaft as the latter, said reversing mechanism being able to move said movable element of the transducer counter to the action of said elastic member in the same direction in response to any displacement of the arm carrying the feeler effected from a rest position, the second lever of the reversing mechanism being mounted pivotably on the first lever and operatively controlling the movements of the movable element of the transducer, said second lever being subjected to the action of the elastic member and two stop means, the first stop means being fixed to the two levers and operating counter to the action of the elastic member to limit the pivotal movement of the second lever relative to the first lever in the action direction of the elastic member when the first lever is pivoted in a direction counter to the action of the elastic member, the second stop means being located beyond the pivotal shaft of the second lever on the first lever towards the electronic transducer, said second stop means being adjustable relative to said pivotal shaft of the second lever on the first lever and fixed to the casing and functioning counter to the action of the elastic member to limit the joint pivotal movement of the two levers about the pivotal shaft of the first lever in the action direction of the elastic member when the first stop means prevents the pivoting of the second lever relative to the first lever in the action direction of the elastic member and to prevent the pivoting of the second lever relative to the first lever in the action direction of the elastic member when the first lever is pivoted in the action direction of the elastic member whereby when the first lever is pivoted in the direction counter to the action of the elastic member, the second lever is retained by the first stop means and pivots jointly with the first lever about the pivotal shaft thereof in the direction counter to the action of the elastic member, and when the first lever is pivoted in the action direction of the elastic member the second lever is retained by the second stop means and pivots relative to the first lever in the direction counter to the action of the elastic member while in the rest position when the first lever is not subjected to any pivoting action the two stop means respectively prevent the relative pivoting of the second lever relative to the first lever in the action direction of the elastic member and the joint pivoting of the two levers about the pivotal shaft of the first lever in the action direction of the elastic member.

2. An electronic sensor according to claim 1 wherein the first lever comprises two parallel branches between which is pivoted the second lever.

3. An electronic sensor according to claim 2 wherein the second lever is fixed to a transverse shaft whose ends are conical and engage in the ball-like thrust members respectively located in supports screwed into the parallel branches of the first lever.

4. An electronic sensor according to claim 2 wherein the first stop means comprises a thrust member arranged transversely on the second lever and whereof the ends are engaged in transverse openings made in the branches of the first lever, said openings having larger dimensions than those of the ends of the stop member.

5. An electronic sensor according to claim 1 wherein the second stop means comprises a stop member mounted eccentrically in a support pivoted in the casing said stop member being supported against the second lever.

6. An electronic sensor according to claim 5 wherein the eccentric stop member is axially adjustable.

7. An electronic sensor according to claim 1 wherein the elastic member is located in the transducer and is supported against the movable element of said transducer.

* * * * *